(12) United States Patent
Lowell

(10) Patent No.: US 10,467,334 B1
(45) Date of Patent: Nov. 5, 2019

(54) COMPUTING SYSTEM FOR ELECTRONIC DOCUMENT MANAGEMENT

(71) Applicant: Complete Contract Cycle, LLC, Port St. Lucie, FL (US)

(72) Inventor: John David Lowell, Port St. Lucie, FL (US)

(73) Assignee: Complete Contract Cycle, LLC, Port St. Lucie, FL (US)

(*) Notice: Subject to any disclaimer, the term of this patent is extended or adjusted under 35 U.S.C. 154(b) by 0 days.

(21) Appl. No.: 15/849,627

(22) Filed: Dec. 20, 2017

Related U.S. Application Data

(60) Provisional application No. 62/443,427, filed on Jan. 6, 2017.

(51) Int. Cl.
  G06F 17/24 (2006.01)
  G06F 3/0484 (2013.01)
  G06F 17/27 (2006.01)
  G06F 16/93 (2019.01)

(52) U.S. Cl.
  CPC .......... *G06F 17/24* (2013.01); *G06F 3/04842* (2013.01); *G06F 16/93* (2019.01); *G06F 17/2705* (2013.01)

(58) Field of Classification Search
  None
  See application file for complete search history.

(56) References Cited

U.S. PATENT DOCUMENTS

| | | |
|---|---|---|
| 5,963,966 A | 10/1999 | Mitchell et al. |
| 6,065,026 A | 5/2000 | Cornelia et al. |
| 6,918,082 B1 | 7/2005 | Gross et al. |
| 7,111,230 B2 | 9/2006 | Euchner et al. |
| 7,818,678 B2 | 10/2010 | Massand |
| 7,966,556 B1 | 6/2011 | Bourdec |

(Continued)

OTHER PUBLICATIONS

"Ubiquitous, Free, and Efficient Online Collaboration Tools for Teaching and Learning" in Turkish Online Journal of Distance Education-TOJDE Oct. 2008 ISSN 1302-6488 vol. 9 No. 4 Notes for Editor-1, retrieved from http://tojde.anadolu.edu.tr/yonetim/icerik/makaleler/437-published.pdf. (Year: 2008).*

*Primary Examiner* — Sanchita Roy
(74) *Attorney, Agent, or Firm* — Medley, Behrens & Lewis, LLC

(57) ABSTRACT

An electronic document review system is disclosed herein. A server computing device extracts sections from an electronic document. The server computing device then receives an identity of a stakeholder and an identity of a section from the sections. The stakeholder is authorized to review and approve the section. Responsive to receiving the identity of the stakeholder and the identity of the section, the server computing device transmits the section to a stakeholder computing device operated by the stakeholder. The stakeholder makes a revision to the section by way of the stakeholder computing device, and the stakeholder computing device then transmits the revision to the server computing device. The server computing device then causes an indication of the revision in redline format to be displayed in a graphical user interface of a client application executing on a client computing device operated by a contract manager.

20 Claims, 12 Drawing Sheets

(56) References Cited

U.S. PATENT DOCUMENTS

| | | | |
|---|---|---|---|
| 2002/0129056 A1* | 9/2002 | Conant | G06Q 30/06 715/255 |
| 2006/0282762 A1 | 12/2006 | Diamond et al. | |
| 2011/0154180 A1 | 6/2011 | Evanitsky et al. | |
| 2013/0246901 A1* | 9/2013 | Massand | G06F 17/24 715/229 |
| 2013/0326330 A1* | 12/2013 | Harris | G06F 17/2288 715/234 |
| 2014/0047330 A1* | 2/2014 | Yan | G06F 3/0486 715/273 |
| 2015/0269146 A1* | 9/2015 | Ayyar | G06F 17/30011 707/608 |

* cited by examiner

| Status | Name | Documents | Date | Actions | |
|---|---|---|---|---|---|
| Created | Transaction 1 | 2 | 11/4/2017 | ✎ | Admin, User 1 |
| In-progress | Transaction 2 | 1 | 10/7/2017 | ✎ | Admin |

...

New Transaction
304

Navigation Bar

Transaction 1

| Status | Name | Clauses | Date | Actions |
|---|---|---|---|---|
| Created | Contract 1 | 12 | 11/4/2017 | ✏ Admin, User 1 |
| In-progress | Contract 2 | 20 | 10/7/2017 | ✏ Admin |

...

New Document
402

Navigation Bar

Transaction 1

Contract 1
Status – Created
Created on 11/4/2017 at 1:00 p.m.
There are 0 associated clauses

| Audit Log | Approve | Add Signatory |
| 504 | 506 | 508 |

Signatories
Stakeholder 1
Stakeholder 2

Clause List

| Status | Name | Date | Action |
|---|---|---|---|
| Approved | Clause 1 | 11/4/2017 | ✎ Admin, User 1 |
| In-Progress | Clause 2 | 11/4/2017 | ✎ Admin |
| ... | | | |

New Clause
502

Navigation Bar
302

COMPUTING SYSTEM FOR ELECTRONIC DOCUMENT MANAGEMENT

RELATED APPLICATION

This application claims priority to U.S. Provisional Patent Application No. 62/443,427, filed on Jan. 6, 2017, the entirety of which is incorporated herein by reference.

BACKGROUND

Currently, conventional systems for management of electronic documents provide limited document control. For example, a computing device operated by a contract manager will present an electronic document on a display. The contract manager is a person who is tasked with ensuring that the electronic document is reviewed, and optionally revised, by a plurality of users. The computing device may then receive input from the manager that delineates sections of the electronic document after the manager has reviewed the electronic document. Then, for each section in the sections, the computing device receives input from the manager identifying one or more individuals who are authorized to review and approve the section. The computing device may also receive input which causes certain sections of the electronic document to be highlighted to inform a user as to which section is to be reviewed by the user. Then, for each user, the computing device will transmit the electronic document to a computing device operated by the user ("user computing device"). The user computing device will then present the electronic document to the user, and he or she can set forth input indicative of changes to one or more of the sections of the electronic document. The user computing device can then transmit the (revised) electronic document to the computing device operated by the contract manager.

Finally, the computing device operated by the manager will receive different documents or different document sections from the users. The computing device will then present the different documents and/or document sections to the manager, and the manager can ascertain whether any changes were made to the section and review and approve the sections in the different documents on the computing device. Responsive to receiving an indication that the manager has finished reviewing the sections, the computing device can generate a finalized electronic document (which may then be transmitted to a computing device operated by a final reviewer for approval). In an example, the computing device operated by the manager can distribute the finalized electronic document to computing devices operated by stakeholders to the document for signature. Thus, conventional systems for document management lead to an inefficient use of computing resources as computing devices operated by many different individuals associated with the document must receive input multiple times in order to generate the finalized electronic document. Additionally, conventional systems lead to inefficient use of network resources as the entire document is transmitted to multiple users, even when some users are tasked with reviewing only a portion of the document.

SUMMARY

The following is a brief summary of subject matter that is described in greater detail herein. This summary is not intended to be limiting as to the scope of the claims.

Described herein are various technologies pertaining to electronic document review and revision. More specifically, the technologies described herein facilitate review and revision of an electronic document between multiple stakeholders.

A server computing device receives an electronic document from a client computing device operated by a contract manager. Responsive to receiving the electronic document, the server computing device extracts sections from the electronic document and stores the sections in a data store. Prior to or subsequent to extracting the sections, the server computing device receives an identity of a stakeholder from the client computing device and an identity of a section from the sections in the electronic document. The stakeholder is a person who is authorized to review and approve the section from the sections. Responsive to receiving the identity of the stakeholder and the identity of the section, the server computing device causes the section to be displayed on a stakeholder computing device operated by the stakeholder.

The stakeholder can then review the section, and in an example, can set forth input to the stakeholder computing device indicative of a revision to the section. The stakeholder computing device may then transmit the revision to the section to the server computing device. Responsive to receiving the revision to the section from the stakeholder computing device, the server computing device causes an indication of the revision to be displayed in a graphical user interface (GUI) of a client application executing on the client computing device. The revision to the section is presented in redline format. The contract manager may then review the revision to the section, and in an example, may set forth input to the client computing device indicative of an approval of the revision to the section. The client computing device can then transmit the approval to the server computing device, which can then modify the section to incorporate the revision.

The above-described process can then be repeated for remaining sections (with potentially different stakeholders) in the electronic document. After the contract manager has reviewed and approved the sections in the electronic document, the client computing device can receive input indicating that the electronic document is to be finalized. The client computing device can then transmit data indicating that the electronic document is to be finalized to the server computing device. Responsive to receiving the data, the server computing device can integrate the sections (including any approved revisions) to generate a finalized electronic document. The server computing device may then transmit the finalized electronic document to the stakeholder computing device for signature by the stakeholder. The stakeholder may then review the finalized electronic document, and in an example, provide an electronic signature for the finalized electronic document by way of the stakeholder computing device. The stakeholder computing device can then transmit the electronic signature to the server computing device, where it can be retained in the data store. The server computing device may also transmit the finalized electronic document to the client computing device and receive an electronic signature for the contract manager in scenarios when the finalized electronic document requires a signature from the contract manager.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIGS. 3-8 depict exemplary graphical user interfaces (GUIs) for a client application and/or a stakeholder application that can be presented on a display of a computing device.

DETAILED DESCRIPTION

Figure 1:
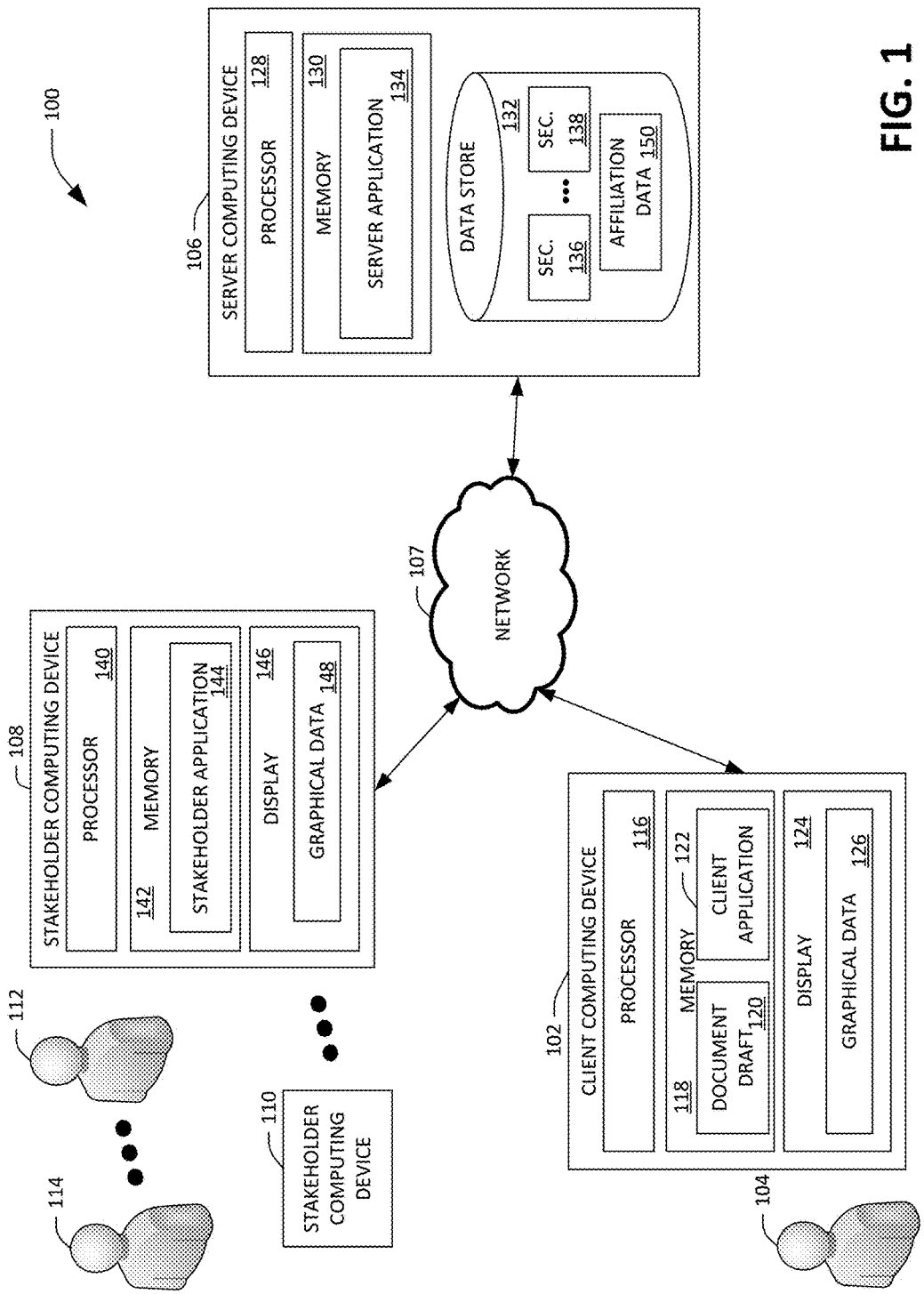
FIG. 1 is a functional block diagram of an exemplary computing system that facilitates contract electronic document review, revision, and approval.

Various technologies pertaining to a document management system that facilitates electronic document section review, revision, and approval are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Further, as used herein, the term "exemplary" is intended to mean serving as an illustration or example of something, and is not intended to indicate a preference.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

Described herein are various technologies pertaining to computer-executable applications that are well-suited for use in an environment that requires management of electronic documents (e.g., such as contracts encoded in electronic form). More specifically, described herein are various technologies pertaining to a computer system, wherein a computer-executable server application can receive an electronic document, and where the server application is configured to extract sections from the electronic document. The server application can receive data, for each section in the extracted sections, wherein the data indicates that a section requires review, revision, and/or approval from a stakeholder at a stakeholder computing device. Responsive to receiving the data, the server application can transmit the section to the stakeholder computing device. The stakeholder may then make modifications to the section or set forth an indication that the section meets the approval of the stakeholder. The server computing device, responsive to the stakeholder either making modifications to the section or approving the section, can receive either: 1) the updated section; or 2) an indication that the section has been approved.

Responsive to receiving some updated sections as well as indications of approval of other sections, the server application reconstructs the electronic document and transmits the electronic document to a client computing device operated by a contract manager, wherein the manager possesses the authority to review the electronic document for final approval. Further, the reconstructed document depicts revisions and history (e.g., redline), such that the manager can quickly ascertain which sections of the electronic document have been updated, and how these sections have been updated. The server application can be further configured to generate a finalized version of the electronic document based upon an indication from the contract manager (by way of a client computing device) that the document is in a finalized form.

Additionally, in the event that the finalized electronic document is a contract that requires signatures, the server application can be configured to receive electronic signatures for the finalized electronic document. More particularly, the server application can be configured to receive an indication that a stakeholder possesses signatory authority for the finalized electronic contract, and can be further configured to transmit the finalized electronic document to the stakeholder (by way of a network and a stakeholder computing device). Further the server application can be configured to receive data comprising the electronic signature of the stakeholder.

In certain cases, the electronic document may require a signature of the contract manager. In these cases, the server application can be configured to transmit the finalized electronic document to the contract manager (by way of the network and the client computing device). The server application can be configured to receive data comprising the electronic signature of the contract manager.

With reference now to FIG. 1, an exemplary computing system 100 that facilitates managing electronic document review, revision, or approval is illustrated. The computing system 100 includes a client computing device 102 that is operated by a contract manager 104 (e.g., general counsel, contract drafter, etc.). The client computing device 102 may be any suitable type of client computing device, including a desktop computing device, a laptop computing device, a mobile telephone, a tablet computing device, a wearable computing device, or the like. The manager 104 may be utilizing the client computing device 102 in connection with review, revision, and/or approval of electronic documents. More particularly, the manager 104 can be a person responsible for obtaining approvals for various sections in an electronic document (e.g., authorization that a clause in the electronic document includes acceptable terms) from stakeholders who possess the ability to grant the approvals. In some cases, an approval may be conditional; i.e., the stakeholder may make a change to a section, and then indicate that the stakeholder approves the section with the condition that the section includes the change. The manager 104 can, responsive to reviewing a revision to a clause of a contract, reject the revision and approve the clause, absent the revision. Alternatively, the manager 104 can accept the revision.

The computing system 100 further includes a server computing device 106 that is in communication with the client computing device 102 by way of a suitable network 107, such as the Internet, an intranet, or the like. The computing system 100 further includes a plurality of stakeholder computing devices 108-110 that are in communication with the server computing device 106 by way of the network 107. As with the client computing device 102, each computing device in the stakeholder computing devices 108-110 may be any suitable type of computing device. The stakeholder computing devices 108-110 are operated by a plurality of stakeholders 112-114. For example, a stakeholder can be a person with approval authority for at least one section of an electronic document (e.g., a stakeholder may be empowered by an employer to approve a section as reciting acceptable terms). Additionally, a stakeholder may be a person who has signatory authority for a contract (e.g., an individual that can legally bind entities to the contract). In certain cases, the manager 104 may have signatory authority for the electronic document and hence in these cases the contract manager 104 may be considered a stakeholder. Thus, in some cases, the plurality of stakeholder computing device 108-110 may not be used as review, approval, and/or revision of the electronic document may take place on the client computing device 102. While the client computing device 102 and the plurality of stakeholder computing devices 108-110 are depicted as being in communication with the server computing device 106 by way of the network 107, it is to be understood that the client computing device 102 and the plurality of stakeholder computing devices 108-110 may be in communication with the server computing device 106 over different networks. In an example, the server computing device 106 can be a cloud-based computing device.

The client computing device 102 includes a processor 116 and memory 118. The memory 116 stores an electronic document draft 120 and instructions that are executed by the processor 116. More specifically, the memory 118 includes a client application 122. The draft 120, in an example, is an electronic version of a draft of a contract (e.g., a word processing application file), where the manager 104 is attempting to get the stakeholders 112-114 to review and approve appropriate sections in the draft 120. As will be described in greater detail herein, the client application 122 is configured to cause the draft 120 to be transmitted to the server computing device 106. Additionally, the client application 122 is configured to facilitate revision and approval of the draft 120 by way of the server computing device 106. The client computing device 102 further comprises a display 124, which is configured to present graphical data 126 to the manager 104. The graphical data 126 may include data presented by way of the client application 122. While the display 124 is depicted as being integral to the client computing device 102, it is to be understood that the display 124 may be externally coupled to the client computing device 102 or may be a projected display.

The server computing device 106 includes a processor 128, memory 130, and a data store 132. The memory 128 stores instructions that are executed by the processor 128. As will be described in greater detail herein, the memory 130 includes a server application 134 that is configured to receive the draft 120 from the client application 122 of the client computing device 102. The server application 134 additionally is configured to extract a plurality of sections 136-138 from the draft 120 and cause the sections 136-138 to be stored in the data store 132. More specifically, the server application 134 parses the draft 120 and identifies boundaries of each section in the plurality of section 136-138 based on the presence of certain markers within the draft 120 (e.g., section breaks, line breaks, section headings, etc.). Based on the identified boundaries, the server application 134 then extracts the plurality of sections 136-138.

The server application 134 can retrieve the sections 136-138 when needed. Additionally, the server application 134 is configured to receive approvals and/or revisions to the plurality of sections 136-138 from the stakeholder computing devices 108-110, and is further configured to transmit a notification to the client computing device 102 when the approvals or revisions have been received by the server application 134.

For example, a stakeholder computing device 108 includes a processor 140 and memory 142. The memory 142 stores instructions that are executed by the processor 140. As will be described in greater detail herein, the memory 142 includes a stakeholder application 144 that is configured to receive a section (e.g., section 136) from the plurality of sections 136-138 from the server application 134 of the server computing device 106, where the stakeholder 112 operating the stakeholder computing device 108 is tasked with finalizing the section 136 (e.g., approve the section 136 in its original form or make changes to the section 136). Accordingly, the stakeholder computing device 108 is in communication with the server computing device 106 (and optionally the client computing device 102) by way of the network 107. Other stakeholder computing devices can operate in a manner similar to the stakeholder computing device 108 as described herein.

The server application 134 can be further configured to obtain an electronic signature for an electronic document from a stakeholder 112 from the plurality of stakeholders 112-114, where the stakeholder 112 possesses signatory authority (as well as an electronic signature for the manager 104 when the manager 104 has signatory authority for the electronic document). The stakeholder computing device 108 further comprises a display 146, which is configured to present graphical data 148 to the stakeholder 112. The graphical data 148 may include data presented by way of the stakeholder application 144. While the display 146 is depicted as being integral to the stakeholder computing device 108, it is to be understood that the display 146 may be externally coupled to the stakeholder computing device 108 or may be a projected display.

Operation of the client application 122, the server application 134, and the stakeholder application 144 is now described. The client application 122 is configured to receive input from the manager 104. In an example, the display 124 can present a GUI for the client application 122, and the client application 122 can receive input from the manager 104. The client application 122, responsive to receiving the input from the manager 104, causes the client computing device 102 to transmit the draft 120 to the server computing device 106 by way of the network 107. The server application 134 receives the draft 120 and extracts the plurality of sections 136-138 from the draft 120. For instance, the server application 134 can execute an algorithm to parse the draft 120 to partition the draft 120 into sections based upon section breaks, section headings, paragraph breaks, etc. Further, the server application 134 can identify words in and among the parsed sections to determine whether a portion of the contract draft 120 comprises a section 136-138. Alternatively, the manager 104 may explicitly identify the sections 136-138.

Responsive to extracting the plurality of sections 136-138 from the draft 120, the server application 134 is configured to cause the server computing device 106 to store the plurality of sections 136-138 in the data store 132 of the server computing device 106 and to transmit data indicating the plurality of sections 136-138 (that have been extracted by the server application 134) to the client computing device 102.

The client application 122 receives the data indicating the plurality of sections 136-138 and causes the sections 136-138 (or headers for the sections 136-138) to be displayed on the display 124 in the graphical data 126. The contract manager 104 can review the sections 136-138 (or headers for the sections 136-138) and indicate (via input to the client application 122) that a section 136 from the sections 136-138 requires review and approval from a stakeholder 112 in the stakeholders 112-114. The client application 122, responsive to receiving the indication from the manager 104, causes the client computing device 102 to transmit data indicating that the stakeholder 112 is required to review and approve the section 136 to the server computing device 106 by way of the network 107. The client application 122 can be optionally configured to retrieve contact information of the stakeholder 112 (e.g., email address, identification number, etc.) and transmit the contact information to the server computing device 106 along with the data indicating that the stakeholder 112 is required to review and approve the section 136. In an embodiment, the client application 122 can be configured to retrieve a list of stakeholders and their associated contact information from the server computing device 106. In the embodiment, the client application 122 can then present the list to the manager 104, and the manager 104 can indicate (via input to the client application 122) that a stakeholder in the list is to review the section 136. For each section in the sections 136-138, the client application 122 is configured to receive an identity of which stakeholder is to review and approve the section. The identity of a stakeholder may also include contact information for the stakeholder that can be used by the server application 134 to contact the stakeholder.

The server application 134 receives the indication that the stakeholder 112 is to review and approve the section 136. Responsive to receiving the indication, the server application 134 is configured to store affiliation data 150 in the data store 132 that indicates that the stakeholder 112 is to review and approve the section 136. The affiliation data 150, as will be described further herein, tracks revisions and approvals of a stakeholder from the plurality of stakeholders 112-114 for a section from the plurality of sections 136-138. Further, the server application 134 is configured to transmit a notification and the section 136 to the stakeholder computing device 108 in the plurality of the stakeholder computing devices 108-110 that is operated by the stakeholder 112. The notification (e.g., email, text message, instant message, etc.) comprises an indication that the section 136 requires the review and approval of the stakeholder 112.

The stakeholder application 144 receives the notification and the section 136. The stakeholder application 144 is configured to cause the notification and the section 136 to be displayed on the display 146 in the graphical data 148. The stakeholder application 144 is further configured to receive input from the stakeholder 112. In an example, the display 146 can present a GUI for the stakeholder application 144, and the stakeholder application 144 can receive input from the stakeholder 112 via the GUI. In the example, the stakeholder application 144 can receive input via the GUI indicating that the stakeholder 112 approves of the section 136, with no changes (e.g., as it is presented in on the display 146). In another example, the stakeholder application 144 can receive input via the GUI from the stakeholder 112 indicating that the section 136 requires revision prior to approval. In the example, the stakeholder application 144 can receive input from the stakeholder 112 via the GUI indicative of a revision to the section 136. The stakeholder application 144 tracks the revision and displays the revision in redline format. More particularly, the redline format allows the section 136, in its original form, to be presented in a first text style and alterations (e.g., additions of text, removal of text, etc.) by the stakeholder 112 to be presented in a second text style (e.g., additions of text underlined and deletions of text struck-through). Responsive to the stakeholder 112 (1) indicating that the stakeholder 112 approves the section 136 or (2) has completed revising the section 136, the stakeholder application 144 is configured to transmit data indicating the approval or the revision of the stakeholder 112 to the server computing device 106.

In an alternative embodiment, the stakeholder application 144 may generate a word processing application file that comprises the section 136. The stakeholder 112 can review and revise the section 136 by way of the word processing file, in a word processing application. In the embodiment, the stakeholder application 144 is configured to receive the word processing file that comprises a change to the section 136. The stakeholder application 144 can process the word processing file to generate data that is indicative of the revision of the section 136. The stakeholder application 144 is configured to transmit the data to the server computing device 106. Alternatively, the stakeholder application 144 can be configured to send the word processing file to the server computing device 106, where the server application 134 can process the word processing file to generate data that is indicative of the revision to the section 136.

The server application 134 receives the data indicating the approval or revision of the stakeholder 112. Responsive to receiving the data, the server application 134 is configured to store the data with the affiliation data 150 in the data store 132, such that the approval or the revision of the stakeholder 112 can be retrieved from the server computing device 106 in the data store 132. In an embodiment, when the server application 134 receives data indicating an approval or revision of the stakeholder 112, the server application 134 is configured to immediately transmit a notification and data indicating the revision of the stakeholder 112 (e.g., a notification and data comprising the revision) to the client computing device 102 by way of the network 107. In another embodiment, the server application 134 is configured to wait until the server application 134 receives data indicating stakeholder approval or revisions for each section (that requires stakeholder approval) in the sections 136-138 prior to transmitting the notification and data indicating the approvals or revisions of the stakeholders 112-114 for the sections 136-138 to the client computing device 102.

When the client application 122 receives the notification and data indicating a revision of the stakeholder 112 (or a notification and data indicating approvals or revisions of the stakeholders 112-114 for the sections 136-138), the client application 122 is configured to cause the notification and the revision of the stakeholder 112 (or approval or revisions of the stakeholders 112-114 for the sections 136-138) to be displayed on the display 124 in the graphical data 126 in redline format (e.g., illustrating changes made to the original version of the section). The client application 122 is further configured to receive input from the manager 104. The manager 104 can review the revision of the stakeholder 112 and indicate (via input to the client application 122) that the revision is approved (with or without additional revision by the manager 104). Alternatively, the manager 104 can indicate that the revision of the stakeholder 112 is rejected. The client application 122, responsive to receiving the indication from the manager 104, causes the client computing device 102 to transmit data indicating that the revision of the stakeholder 112 is approved (with or without the additional revisions) or rejected to the server computing device 106. The server computing device 106 can then transmit a message to the stakeholder computing device 108 indicating that the revision is approved (with or without the additional revisions) or rejected. In a scenario where the client application 122 receives data indicating an approval of the stakeholder 112, the client application 122 is configured to cause the notification to be displayed on the display 124 in the graphical data 126.

In an example, the contract manager 104 may decide that a second stakeholder can review and approve the section 136. The client computing device 102 can receive an identity of the second stakeholder and the identity of the section 136 from the contract manager 104. The client computing device 102 can then transmit the identity of the second stakeholder to the server computing device 106, wherein the server computing device 106 can cause the section 136 to be presented to the second stakeholder by way of a second stakeholder computing device operated by the second stakeholder 114. The server computing device 106 can then receive a second revision to the section 136 from the second stakeholder computing device. Subsequently, the server computing device 106 can cause both the revision made by the stakeholder 112 and the second revision made by the second stakeholder to be presented in a GUI of the client application 122. The client application 122 may then receive input from the contract manager 104 indicating that the contract manager 104 approves or rejects the revision and/or the second revision. Responsive to receiving the input from the contract manager 104, the client computing device 102 can transmit approvals and/or rejections of the revision and the second revision to the server computing device 106, wherein the server computing device 106 can incorporate the revision and/or the second revision into the section 136 when an approval of the revision and/or the second revision is received. The server computing device 106 can also transmit a message to the stakeholder computing device 108 and/or the second stakeholder computing device indicating whether or not the revision and/or the second revision was accepted by the contract manager 104.

Subsequent to the manager 104 reviewing approvals and/or revisions for each section in the plurality of the sections 136-138 by the stakeholders 112-114 (by way of the network 107), the server application 134 is configured to transmit data indicating that the sections 136-138 have been reviewed to the client computing device 102. Further, the server application 134 can be optionally configured to generate logs (e.g., audit file, tables, etc.) of approvals or revisions of the stakeholders 112-114 and to transmit the logs with the data to the client computing device 102. Responsive to the client computing device 102 receiving the data (and the logs), the client application 122 is configured to cause graphical data 126 to be displayed on the display 124 indicating that sections 136-138 have been reviewed, revised, and approved. The client application 122 can provide options on the display 124 for (1) the display 124 to display the revisions and approvals (in redline format); (2) the display 124 to display the logs; (3) the server application 134 of the server computing device 106 to generate a finalized version of the draft 120 (based upon the approvals and revisions to the sections). The client application 122 is further configured to receive input from the manager 104. Additionally, the manager 104 can indicate that a stakeholder (e.g., stakeholder 112) in the plurality of stakeholders 112-114 has signatory authority for the contract. In an example where the manager 104 indicates (via input to the client application 122) that the server application 134 is to generate a finalized draft, the client application 122 causes the client computing device 102 to transmit data indicating that the finalized draft is to be generated by the server application 134 to the server computing device 106. The data can include an indication of the stakeholder 112 that has signatory authority for the contract.

Responsive to receiving the data indicating that a finalized draft is to be generated, the server application 134 is configured to generate the finalized draft based upon the sections 136-138 and the revisions and approvals in the affiliation data 150. More particularly, the server application 134 is configured to identify the stakeholder revisions that have been approved by the manager 104 and to generate a finalized draft (in a word processing file) that comprises approved revisions and sections 136-138 that have no affiliated approved revisions. Further, in an embodiment where the data indicating that the finalized draft is to be generated comprises an indication of the stakeholder 112 that has signatory authority for the contract, the server application 134 can send the finalized draft and a notification indicating that the finalized draft is ready to be signed by the stakeholder 112 to the stakeholder computing device 108. The stakeholder application 144 receives the notification and the finalized draft. The stakeholder application 144 is configured to cause the notification to be displayed on the display 146 in the graphical data 148 indicating that the finalized draft is ready to be signed. The stakeholder application 144 is further configured to receive input from the stakeholder 112. The input can comprise an electronic signature of the stakeholder 112. Responsive to receiving the electronic signature of the stakeholder 112, the stakeholder application 144 is configured to transmit data comprising the electronic signature to the server computing device 106. The server application 134 is configured to receive the electronic signature and to store the electronic signature for retrieval.

In an embodiment, the server application 134 can be configured to obtain electronic signatures from a plurality of stakeholders. Additionally, the server application 134 can be configured to obtain the electronic signatures at a specified time (e.g., window of hours on a data specified by the contract manager 104).

Although the system described above has been described as using a single client computing device operated by a single contract manager, other possibilities are contemplated. For instance, in a scenario in which the electronic document is a contract, there will be more than one party to the contract and hence more than one contract manager. In an embodiment, the contract manager 104 and the stakeholders 112-114 may belong to a first entity (e.g., a corporation, partnership, etc.) and a second contract manager and second stakeholders may belong to a second entity. Likewise, the contract (e.g., the electronic document) may be between the first entity and the second entity. The second contract manager operates a second client computing device that is in communication with the server computing device 106 by way of the network 107. The second client computing device comprises similar components to that of the client computing device 102. The draft 120 can be transmitted to the server computing device 106 by the client computing device 102, and the server computing device 106 can extract the sections as described above. Each client computing device can then receive input from its respective contract manager assigning the section 136 to a stakeholder belonging to the entity to which the respective contract manager belongs. As noted above, in certain cases, either the contract manager 104 and/or the second contract manager will be a stakeholder. The above-described review, revision, and approval process may then be performed between the client computing device 102 and stakeholder computing devices operated by the stakeholders 112-114 and the second client computing device and stakeholder computing devices operated by the second stakeholders, respectively.

In an example, the client computing device 102 may receive an approval of a revision made to the section 136 from the contract manager 104 (e.g., a revision made by the stakeholder 112 and/or a revision made by the contract manager 104). The client computing device 102 can then transmit the revision to the section 136 to the server computing device 106. The server computing device 106 can then cause the second client computing device to present the revision to the section 136 on a display of the second client computing device. The second contract manager may then review the revision to the section 136. In the event that the second contract manager accepts the revision, the second client computing device can receive input from the second contract manager indicating that the second contract manager approves the revision. In the event that the second contract manager does not accept the revision, the second client computing device may receive input from the second contract manager indicating that the second contract manger does not approve the revision. The second client computing device may also receive input indicative of a second revision to the section (e.g., a revision made by a second stakeholder belong to the second entity and/or a revision made by the second contract manager). The above-described revision and review process may be repeated until the server computing device 106 receives an approval for the (revised) section 136 from both the client computing device 102 and the second client computing device.

When the server computing device 106 has received an approval for the section 136 from both the client computing device 102 and the second client computing device, the server computing device 106 can incorporate any revisions made to the section 136 into the electronic document. After the server computing device 106 receives approvals of each section in the sections 136-138 from both the client computing device 102 and the second client computing device, the server computing device 106 may then finalize the electronic document and receive electronic signatures from stakeholders from the first entity and stakeholders from the second entity as described above.

Figure 2:
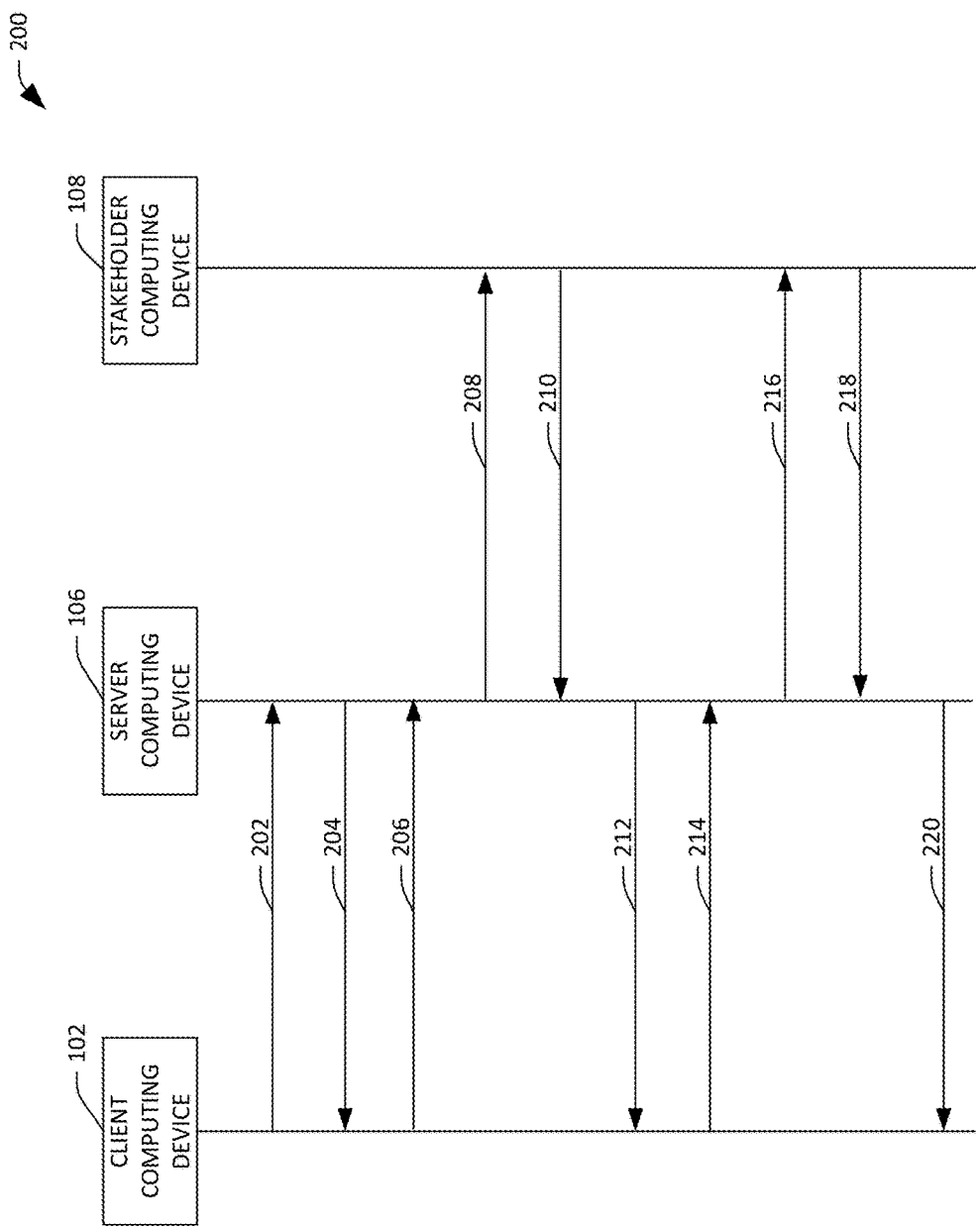
FIG. 2 is a communications diagram illustrating communications among computing devices of an exemplary system that facilitates electronic document section review, revision, and approval.

Referring now to FIG. 2, a communications diagram is shown that illustrates exemplary communications among computing devices in connection with facilitating review and approval of an electronic document. At 202, the client computing device 102 transmits a draft to the server computing device 106, responsive to the manager 104 indicating that the draft is ready for review and approval. Upon receiving the draft, the server computing device 106 extracts sections 136-138 from the draft and stores the sections 136-138 in the data store 132.

At 204, upon extracting the sections from the draft, the server computing device 106 transmits the sections 136-138 to the client computing device 102. Upon receiving the sections 136-138, the client application 122 of the client computing device 102 causes the sections 136-138 (or alternatively headings for the sections) to be presented on the display 124 to the manager 104. Further, the manager 104 identifies, for each section in the sections, a certain stakeholder who is to review and approve the section. In an example, the manager 104 identifies that the stakeholder 112 is to review and approve the section 136.

At 206, upon receiving the identity of the stakeholder 112 from the manager 104, the client application 122 is configured to transmit data indicating that the stakeholder 112 is to review and approve the section 136 to the server computing device 106. The data may additionally include contact information for the stakeholder 112.

At 208, responsive to receiving the data from the client computing device 102, the server application 134 of the server computing device 106 transmits a notification to the stakeholder computing device 108 that the section 138 is to be approved by the stakeholder 112. Responsive to receiving the notification and the section 136, the stakeholder application 144 of the stakeholder computing device 108 is configured to cause a display 146 to display the notification and the section 136. The stakeholder application 144 is additionally configured to receive input from the stakeholder 112 indicating whether the stakeholder 112 has revised the section 136 or approved the section 136 without making changes.

At 210, responsive to receiving input from the stakeholder 112 (e.g., that the stakeholder approves the section 136 without changes or that the stakeholder 112 has made changes to the section 136), the stakeholder application 144 transmits such input to the server computing device 106. Responsive to receiving the input, the server application 134 is configured to update the affiliation data 150 with the revision or approval.

At 212, the server application 134 is further configured to transmit data to the client computing device 102, where the data indicates that the revision or approval for the section 136 has been received from the stakeholder 112. The server application 134 can be configured to transmit the data responsive to receiving the revision or approval for the section 136. Alternatively, the server application 134 can be configured to transmit the data responsive to receiving revisions or approvals for each section in the sections 136-138. In other words, the server application 134 can wait until all the revisions or approvals have been received. Upon receiving the data, the client application 122 of the client computing device 106 is configured to cause the display 124 to display the received revision or approval (or revisions or approvals) to the manager 104. The manager 104 can review the revisions or approvals at the client computing device 102.

At 214, the manager 104 can indicate, via input to the client application 122, that a finalized electronic document (e.g., a final contract) is to be generated based upon the received revisions or approvals. Responsive to the indication, the client computing device 102 transmits data indicating that the finalized document is to be generated to the server computing device 106. The client computing device 102 may additionally transmit data that indicates that a stakeholder 112 in the stakeholders 112-114 has signatory authority for the finalized document (based upon input by the manager to the client application 122). Upon receiving the data, the server application 134 of the server computing device 106 generates the finalized document.

At 216, responsive to generating the finalized document, the server application 134 transmits a notification and the finalized document to the stakeholder computing device 108 operated by the stakeholder 112 who has signatory authority. The stakeholder application 144 can cause the display 146 to present the finalized document to the stakeholder 112. Further, the stakeholder 112 can input an electronic signature for the finalized document via input to the server application 144.

At 218, responsive to receiving the electronic signature for the finalized document, the stakeholder application 144 transmits data comprising the electronic signature to the server computing device 106. The server application 134, responsive to receiving the electronic signature, is configured to store the electronic signature in the data store 132.

At 220, the server application 134 may additionally be configured to transmit a notification to the client computing device 102 indicating that the electronic signature was received. In the event that the electronic document is a contract, the server application 134 may also transmit a notification to another client computing device operated by a contract manager of another party to the contract. Responsive to receiving the notification, the client application 122 of the client computing device 102 can cause the display 124 to output a notification indicating that the electronic signature was received.

FIGS. 3-8 depict exemplary GUIs that can be used with technologies described above. While the GUIs are described as being primarily presented on the display 124 of the client computing device 102, it is understood that some of the GUIs (in particular, the GUIs depicted in FIGS. 6 and 8) may also be presented on the display 146 of the stakeholder computing device 108. Thus, depending on the embodiment, the GUIs depicted in FIGS. 3-8 may also be presented on the display 146 of the stakeholder computing device 108.

With reference to FIG. 3, an exemplary GUI 300 that can be presented on the display 124 of the client computing device 102 is illustrated. The GUI 300 can include a navigation bar 302 which can provide access to functionality of the client application 122 and/or the stakeholder application 144. In a non-limiting example, the navigation bar 302 can include selectable links to transactions, electronic documents, organizational details, and user information. When a link within the navigation bar 302 is selected, the GUI 300 can be updated to display information corresponding to the link. The GUI 300 displays information relating to pending transactions for a user and/or an organization. Each transaction has one or more associated electronic documents. GUI 300 may also include a new transaction button 304. When selected by a user (e.g., the contract manager 104), the client computing device can cause a new transaction to be created.

Now turning to FIG. 4, an exemplary GUI 400 that can be presented on the display 124 of the client computing device 102 after a selection of a transaction displayed in the GUI 300 is illustrated. The GUI 400 displays information relating to all electronic documents in a particular transaction. The GUI 400 may also include a new document button 402. When selected by a user (e.g., the contract manager 104), the client computing device 102 can cause a draft electronic document to be transmitted to the server computing device 106.

Referring now to FIG. 5, an exemplary GUI 500 that can be presented on the display 124 of the client computing device 102 after a selection of an electronic document in the GUI 400 is illustrated. The GUI 500 displays information relating to clauses (i.e., sections) of the electronic document. Each clause may include a selectable indicia (depicted as a pencil in the GUI 500). When a selectable indicia for a clause is selected by a user (e.g., the contract manager 104), the GUI 500 can be updated to include a window that can display identities of other users (e.g., stakeholders). The user can select an identity of a stakeholder from the identities which can cause the clause to be assigned to the stakeholder. The GUI 500 may additionally include a new clause button 502, an audit log button 504, an approval button 506, and an add signatory button 508. When selected by the user (e.g., the contract manager 104), the new clause button can cause a new clause to be added to the electronic document. The GUI 500 can then be updated to display an identifier for the new clause. The audit log button 504 can cause an audit log to be presented to the user, wherein the audit log comprises all revisions (and their corresponding stakeholders) that have been made to the electronic document. The add signatory button 508 be selected by the user to add a signatory (e.g., a stakeholder) to the electronic document. After the contract manager 104 is satisfied with all clauses in the electronic document, he or she may select the approve button 506 to generate a finalized electronic document and transmit the finalized electronic document to signatories to the electronic document.

Figure 6:
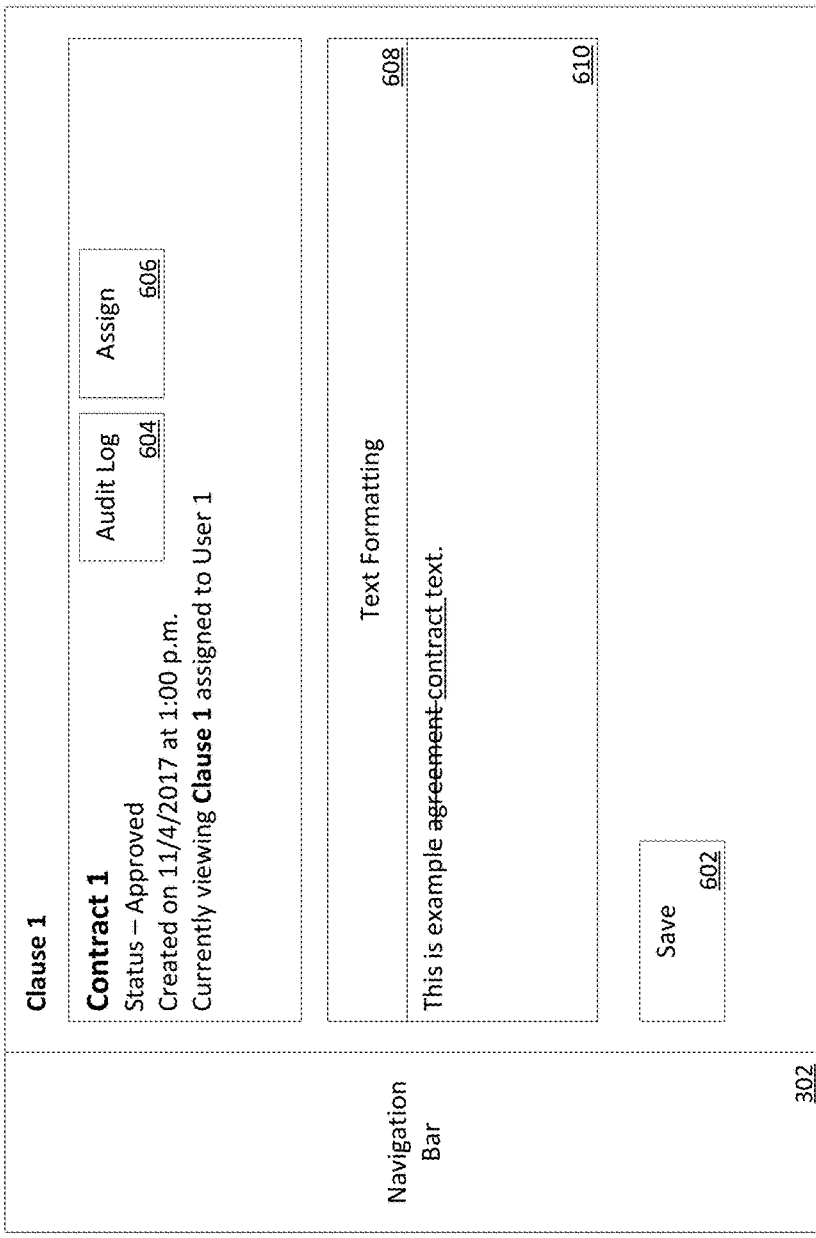

With reference to FIG. 6, an exemplary GUI 600 that can be presented on a display of a computing device (e.g., the client computing device 102 or the stakeholder computing device 108) is illustrated. The GUI 600 presents a clause (i.e., a section) to the contract manager 104 and/or the stakeholder 112. Text of the clause can be presented in a clause text window 610. Any revisions made to the clause by the contract manager 104 and/or the stakeholder 112 are also displayed in redline format within the clause text window 610. The GUI 600 also includes a text formatting window 608. The text formatting window 608 includes tools for text formatting and manipulation. For instance, the text formatting window 608 can include tools to change font size, font type, etc. The GUI 600 also includes an assign button 606. When selected by a user, the assign button 606 can cause a window to be presented on the display that presents identities of the stakeholders 112-114. The user may select an identity of a particular stakeholder in order to assign the clause to the particular stakeholder.

Figure 7:
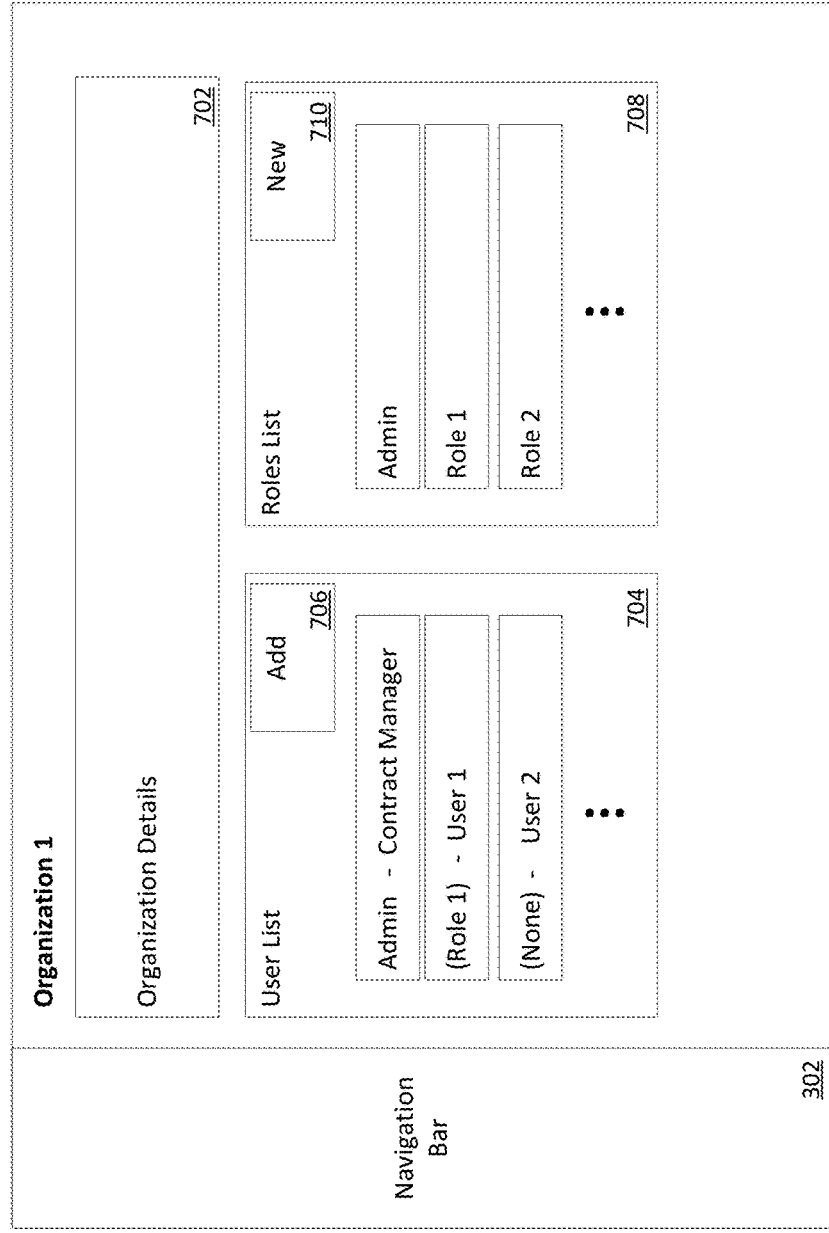

Turning now to FIG. 7, an exemplary GUI 700 that can be presented on the display 124 of the client computing device 102 is illustrated. The GUI 700 may include an organization details window 702 that displays information (e.g., an address, a phone number, etc.) relating to an organization to which one or more of the stakeholders 112-114 belong. The GUI 700 may also include a user list 704 that presents a list of users (e.g., stakeholders) and their corresponding roles within the organization. New users may be added via an add users button 706. Furthermore, the GUI 700 may include a roles list 708 that displays roles (e.g., legal, financial, information technology, etc.) within the organization. New roles may be added via a new role button 710. When the contract manager 104 selects the add user button 706, the GUI 700 may present a window wherein the contract manager 104 can input an identity of a new user. The window can also allow the contract manager to assign a role listed in the roles list 708 to the new user.

Figure 8:
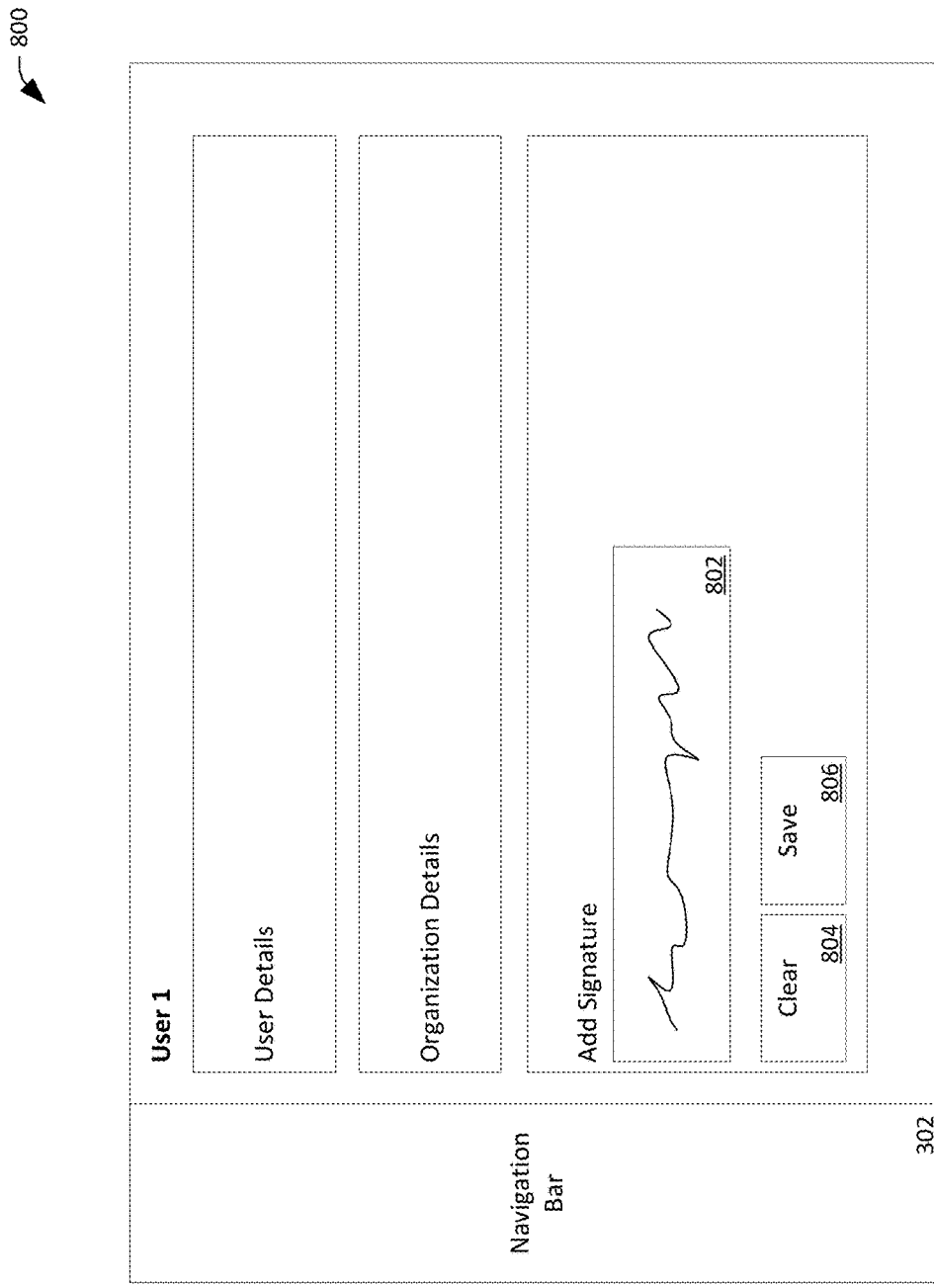

With reference to FIG. 8, an exemplary GUI 800 that can be presented on a display of the client computing device 102 and/or the stakeholder computing device 108 illustrated. The GUI 800 displays information relating to a user (e.g., a stakeholder) and optionally information relating to an organization of the user. The GUI 800 includes an add signature window 802 wherein a user can set forth an electronic signature. If the user is not satisfied with his or her electronic signature, he or she may select a clear button 804 in order to clear the electronic signature set forth in the signature window 802. When the user is satisfied with the electronic signature, he or she can select a save button 806 which causes the electronic signature to be transmitted to the server computing device 106 where it can be stored in the data store 132.

Figure 9:
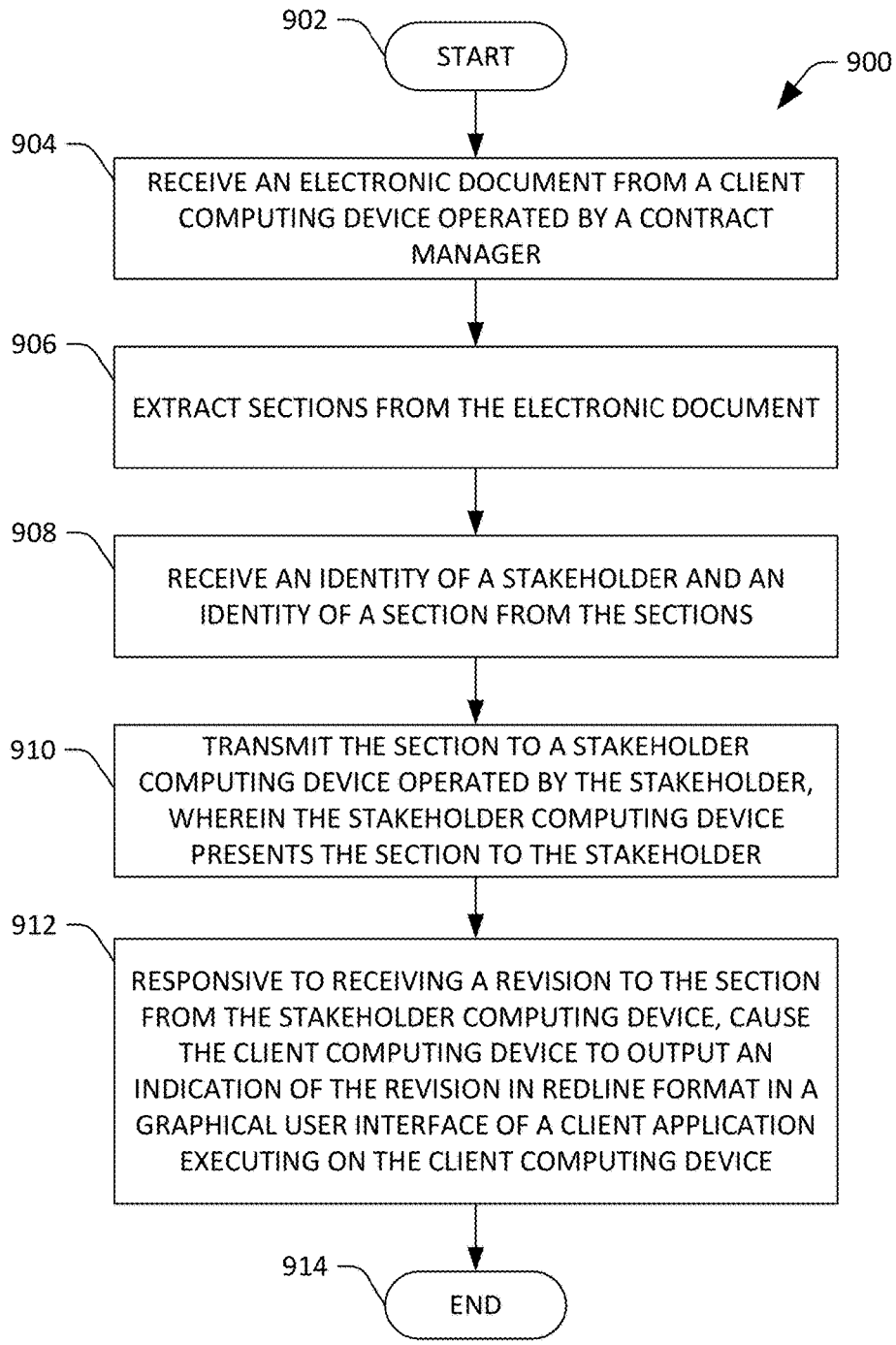
FIG. 9 is a flow diagram illustrating an exemplary methodology executed by a server computing device that facilitates electronic document review, revision, and approval.
Figure 10:
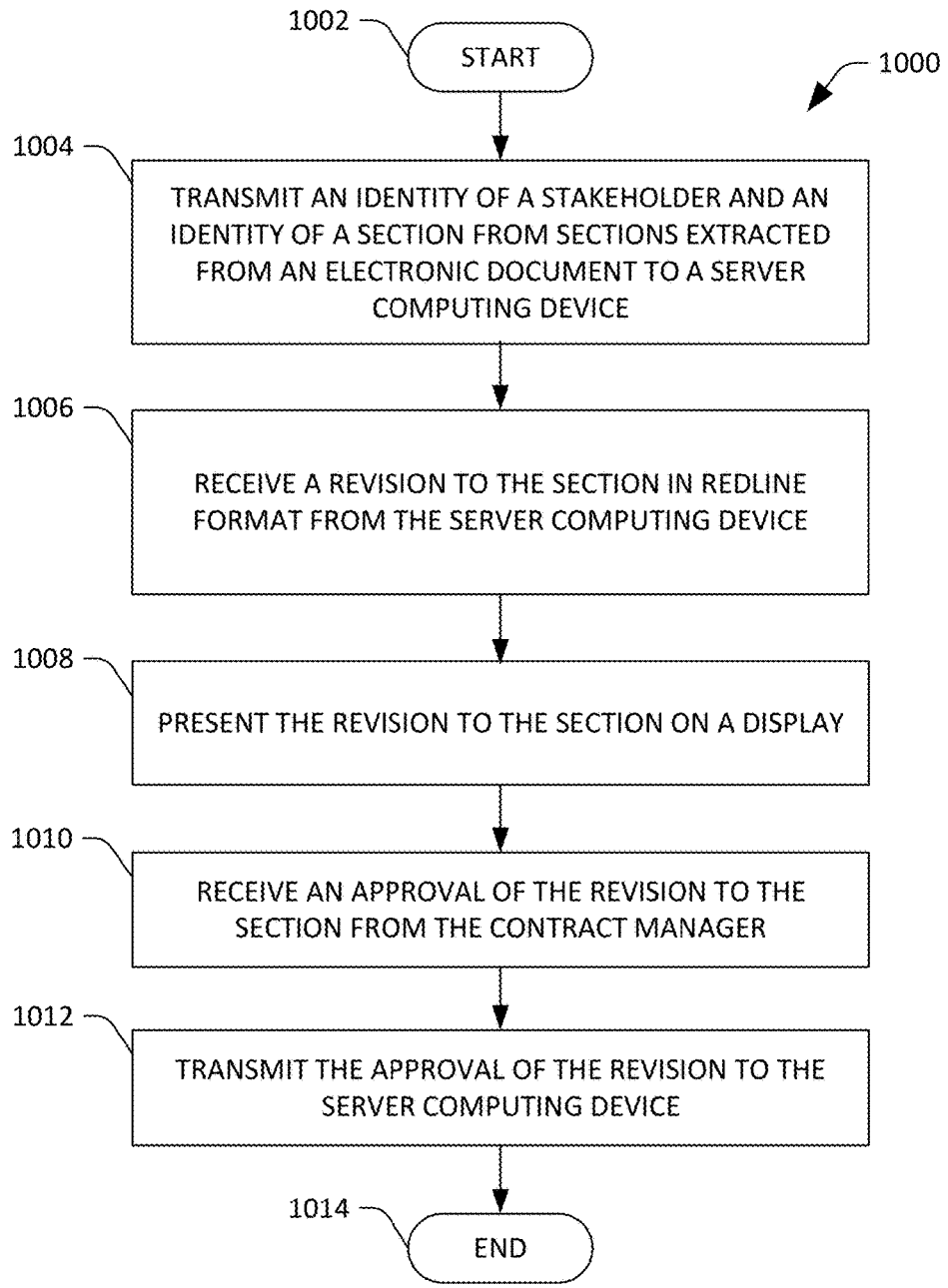
FIG. 10 is a flow diagram illustrating an exemplary methodology executed by a client computing device that facilitates electronic document review, revision, and approval.
Figure 11:
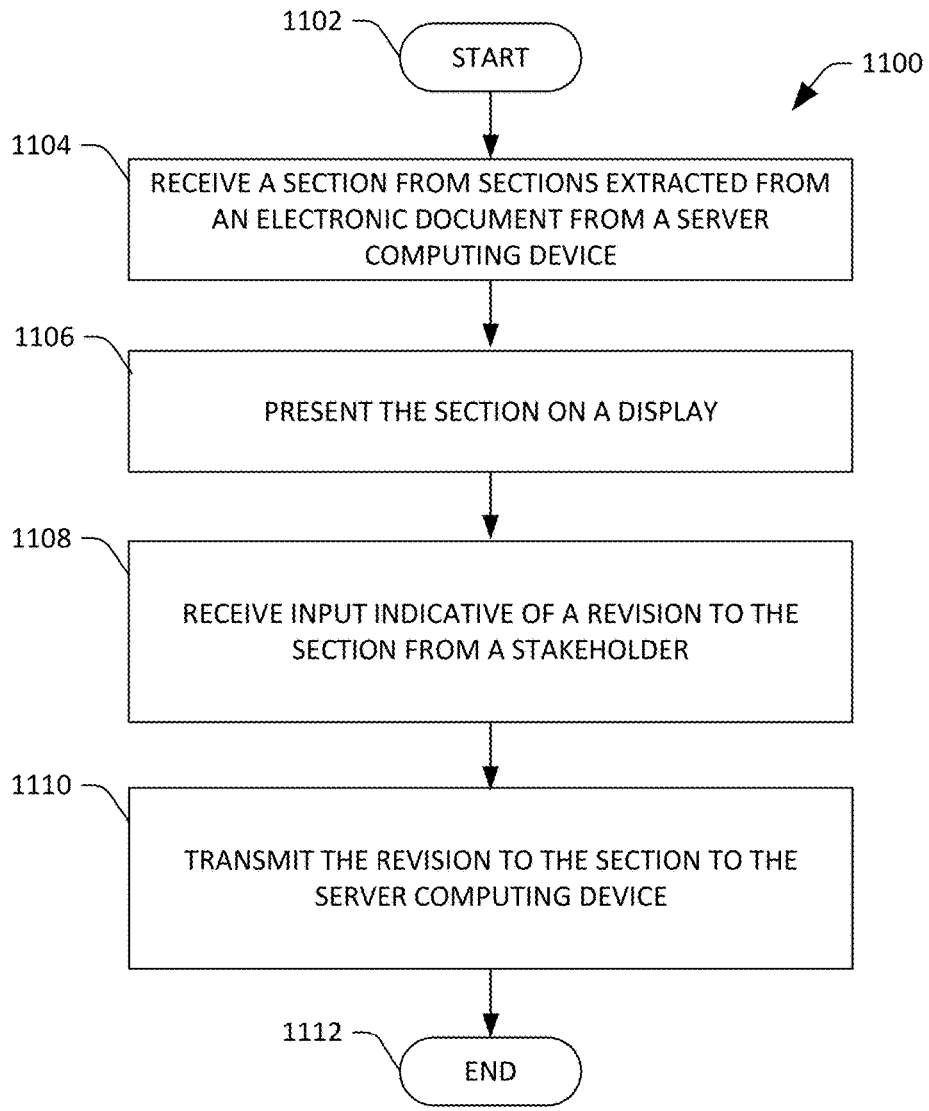
FIG. 11 is a flow diagram illustrating an exemplary methodology executed by a stakeholder computing device that facilitates electronic document review, revision, and approval.

FIGS. 9-11 illustrate exemplary methodologies relating to an electronic document review system. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 9, a methodology 900 executed at a server computing device that facilitates electronic document review is illustrated. The methodology 900 begins at 902, and at 904, the server computing device receives an electronic document from a client computing device operated by a contract manager. At 906, the server computing device extracts sections from the electronic document. Subsequently, at 908, the server computing device receives an identity of a stakeholder and an identity of a section from the sections. The stakeholder has authority to review and approve the section. At 910, the server computing device transmits the section to a stakeholder computing device operated by the stakeholder. The stakeholder computing device than presents the section to the stakeholder on a display and the stakeholder can make a revision to the section. At 912, responsive to receiving the revision to the section from the stakeholder computing device, the server computing device can output an indication of the revision in redline format, wherein the indication is displayed in a GUI of a client application executing on the client computing device. The methodology 900 concludes at 914.

Turning now to FIG. 10, a methodology 1000 executed at a client computing device that facilitates electronic document review is illustrated. The methodology 1000 begins at 1002, and at 1004 the client computing device transmits an identity of a stakeholder and an identity of a section extracted from an electronic document to a server computing device. The server computing device then retrieves the section and transmits the section to a stakeholder computing device operated by the stakeholder who can subsequently review and revise the section on the stakeholder computing device. The stakeholder computing device can then transmit the revision to the server computing device. Subsequently, at 1006, the client computing device can receive the revision to the section from the server computing device in redline format. At 1008, the client computing device can present the revision to the section to a contract manager operating the client computing device. The contract manager can then review the revision, and at 1010, the client computing device can receive an approval of the revision to the section from the contract manager. At 1012, the client computing device can then transmit the approval of the revision to the server computing device. The methodology 1000 concludes at 1014.

With reference now to FIG. 11, a methodology 1100 executed at a stakeholder computing device that facilitates electronic document review is illustrated. The methodology 1100 begins at 1102, and at 1104 the stakeholder computing device receives a section extracted from an electronic document by a server computing device. At 1106, the stakeholder computing device presents the section on a display of the stakeholder computing device. The section can then be viewed by a stakeholder operating the stakeholder computing device. After the stakeholder reviews the section, at 1108, the stakeholder computing device can receive input from the stakeholder indicative of a revision to the section. Subsequently, at 1110, the stakeholder computing device can transmit the revision to the section to the server computing device. The methodology 1100 concludes at 1112.

Figure 12:
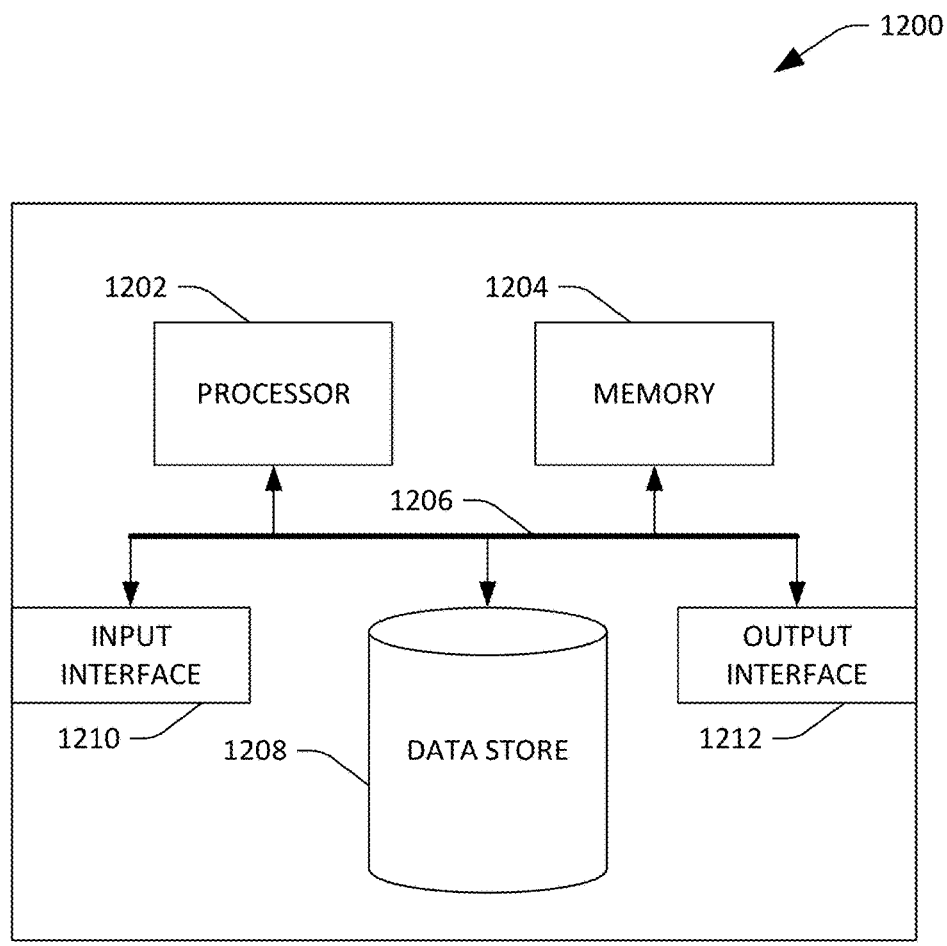
FIG. 12 is an exemplary computing device.

Referring now to FIG. 12, a high-level illustration of an exemplary computing device 1200 that can be used in accordance with the systems and methodologies disclosed herein is illustrated. For instance, the computing device 1200 may be used in a system that facilitates document section review, revision, or approval. The computing device 1200 includes at least one processor 1202 that executes instructions that are stored in a memory 1204. The instructions may be, for instance, instructions for implementing functionality described as being carried out by the server computing device 106, as described above. The processor 1202 may access the memory 1204 by way of a system bus 1206. In addition to storing executable instructions, the memory 1204 may also store images, threshold values, etc.

The computing device 1200 additionally includes a data store 1208 that is accessible by the processor 1202 by way of the system bus 1206. The data store 1208 may include executable instructions, images, etc. The computing device 1200 also includes an input interface 1210 that allows external devices to communicate with the computing device 1200. For instance, the input interface 1210 may be used to receive instructions from an external computer device, from a user, etc. The computing device 1200 also includes an output interface 1212 that interfaces the computing device 1200 with one or more external devices. For example, the computing device 1200 may display text, images, etc. by way of the output interface 1212.

It is contemplated that the external devices that communicate with the computing device 1200 via the input interface 1210 and the output interface 1212 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1200 in a manner free from constraints imposed by input devices such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1200 may be a distributed system. Thus, for instance, several devices may be in communication by way of a network connection and may collectively perform tasks described as being performed by the computing device 1200.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A server computing device comprising:

at least one processor; and memory that stores instructions that, when executed by the at least one processor, cause the at least one processor to perform acts comprising:

receiving an electronic document from a computing device that is in network communication with the server computing device, the electronic document comprising sections that are delineated by markers in the electronic document, wherein each section in the sections is to be approved by a respective stakeholder, and further wherein the electronic document is to be approved by an authoritative user only after each stakeholder in the stakeholders has independently approved a respective section in the sections that has been assigned to the stakeholder;

responsive to receiving the electronic document, identifying the markers in the electronic document that delineate the sections;

responsive to identifying the markers in the electronic document, extracting the sections from the electronic document;

identifying the stakeholders who are to respectively approve each of the sections;

transmitting, to each stakeholder computing device from amongst stakeholder computing devices operated by the stakeholders, only the respective section that is assigned to a respective stakeholder who is operating the stakeholder computing device, wherein the stakeholder computing device causes the respective section to be displayed to the respective stakeholder;

subsequent to transmitting the sections to the respective stakeholder computing devices, receiving, at different times from the stakeholder computing devices, respective indications that the stakeholders have approved each of the sections;

when each indication in the indications is received, transmitting a notification to a client computing device operated by the authoritative user, wherein the notification indicates that the respective section has been approved by a respective stakeholder and is now to be approved by the authoritative user;

receiving, for each section in the sections, an indication from the client computing device that the authoritative user has approved the section;

when the server computing device receives indications that each section in the sections has been approved by the respective stakeholder and the authoritative user, re-constructing the electronic document to form a reconstructed electronic document, wherein the reconstructed electronic document includes approved sections that have been approved by the authoritative user;

responsive to re-constructing the electronic document, transmitting the reconstructed electronic document and a request for a signature on the reconstructed electronic document to the client computing device; and subsequent to transmitting the reconstructed electronic document and the request for the signature on the reconstructed electronic document, receiving the reconstructed electronic document with the signature thereon.

2. A method executed by a processor of a server computing device, the method comprising:

receiving an electronic document from a computing device that is in network communication with the server computing device, the electronic document comprising sections that are delineated by markers in the electronic document, wherein each section in the sections is to be approved by a respective stakeholder who is assigned the section from amongst several stakeholders, and further wherein the electronic document is to be approved by an authoritative user only after each stakeholder has approved the section that is assigned to the respective stakeholder;

responsive to receiving the electronic document, identifying the markers in the electronic document that delineate the sections;

responsive to identifying the markers in the electronic document, extracting the sections from the electronic document;

identifying, for each section in the sections, the respective stakeholder who is to approve the section from amongst the several stakeholders;

transmitting the sections to stakeholder computing devices operated by the several stakeholders, wherein the stakeholder computing devices cause sections to be displayed to the plurality of stakeholders, and further wherein each section in the sections is only transmitted to a respective stakeholder computing device operated by the respective stakeholder who has been assigned the section;

subsequent to transmitting the sections to the stakeholder computing devices, receiving, at different times from the stakeholder computing devices, respective indications that each stakeholder in the several stakeholders has approved the section assigned to the respective stakeholder;

when each indication in the indications is received, transmitting a respective notification to a client computing device operated by the authoritative user, wherein the respective notification indicates that the respective stakeholder has approved the section and the section is now to be approved by the authoritative user;

receiving, for each section in the plurality of sections, an indication from the client computing device that the authoritative user has approved the section;

when the server computing device receives indications that each section in the plurality of sections has been approved by the respective stakeholder and the authoritative user, re-constructing the electronic document to form a reconstructed electronic document, wherein the reconstructed electronic document includes approved sections that have been approved by the authoritative user;

responsive to re-constructing the electronic document, transmitting the reconstructed electronic document and a request for a signature on the reconstructed electronic document to the client computing device; and subsequent to transmitting the reconstructed electronic document and the request for the signature on the reconstructed electronic document, receiving the reconstructed electronic document with the signature thereon.

3. A computer-readable storage medium comprising instructions that, when executed by a processor of a server computing device, cause the processor to perform acts comprising:

receiving an electronic document from a computing device that is in network communication with the server computing device, the electronic document comprising sections that are delineated by markers in the electronic document, wherein each section in the sections is to be approved by a respective stakeholder who has been assigned the section from amongst several stakeholders, and further wherein the electronic document is to be approved by an authoritative user only after each section has been independently approved by the respective stakeholder who has been assigned the section;

responsive to receiving the electronic document, identifying the markers in the electronic document that delineate the sections;

responsive to identifying the markers in the electronic document, extracting the sections from the electronic document;

identifying, for each section in the sections, the respective stakeholder who is to approve the section;

transmitting each section only to a respective stakeholder computing devices operated by the respective stakeholder who has been assigned the section, wherein the respective stakeholder computing device causes the section to be displayed to the respective stakeholder who has been assigned the section;

subsequent to transmitting the section to the respective stakeholder computing device, receiving, at different times from stakeholder computing devices, respective indications that each section in the sections has been approved by the respective stakeholder who has been assigned the section;

when each indication in the indications is received, transmitting a notification to a client computing device operated by the authoritative user, wherein the notification indicates that a respective section has been approved by a respective stakeholder and is now to be approved by the authoritative user;

receiving, for each section in the sections, an indication from the client computing device that the authoritative user has approved the section;

when the server computing device receives indications that each section in the sections has been approved by the respective stakeholder and the authoritative user, re-constructing the electronic document to form a reconstructed electronic document, wherein the reconstructed electronic document includes approved sections that have been approved by the authoritative user;

responsive to re-constructing the electronic document, transmitting the reconstructed electronic document and a request for a signature on the reconstructed electronic document to the client computing device; and subsequent to transmitting the reconstructed electronic document and the request for the signature on the reconstructed electronic document, receiving the reconstructed electronic document with the signature thereon.

4. The server computing device of claim 1, the acts further comprising:
   prior to identifying the stakeholders who are to respectively approve the sections, transmitting, to the client computing device, the sections extracted from the electronic document, wherein the client computing device causes the sections to be displayed to the authoritative user.

5. The server computing device of claim 1, the acts further comprising:
   receiving section identifiers from the client computing device, wherein the section identifiers identify the sections in the electronic document.

6. The server computing device of claim 1, the acts further comprising:
   receiving a mapping from the client computing device, wherein the mapping identifies, for each section in the sections, the respective stakeholder from amongst the stakeholders who is to approve the respective section.

7. The server computing device of claim 1, the acts further comprising:
   responsive to transmitting each respective notification to the client computing device, causing the client computing device to display a revision to the respective section made by the respective stakeholder who has approved the section.

8. The server computing device of claim 7, wherein the reconstructed electronic document comprises the revision to the section.

9. The server computing device of claim 1, the acts further comprising:
   generating a log of revisions and approvals by the stakeholder computing devices and the client computing device, wherein the log is transmitted to the client computing device to be displayed on a display of the client computing device.

10. The server computing device of claim 1, wherein the stakeholders have signatory authority for the approved sections of the reconstructed electronic document that are respectively assigned to the stakeholders, the acts further comprising:
    transmitting each approved section of the reconstructed document and a request for stakeholder signature to a respective stakeholder computing device operated by the stakeholder who has been assigned the section that corresponds to the approved section; and
    subsequent to transmitting the approved section and the request for stakeholder signature receiving each approved section with a respective stakeholder signature thereon.

11. The server computing device of claim 10, the acts further comprising:
    storing each approved section with the respective stakeholder signature thereon in a datastore.

12. The server computing device of claim 1, the acts further comprising:
    subsequent to receiving the reconstructed electronic document with the signature thereon, transmitting the reconstructed electronic document and a second request for a second signature on the reconstructed electronic document to a second client computing device operated by a second authoritative user.

13. The method of claim 2, further comprising:
    receiving a mapping from the client computing device, wherein the mapping defines, for each section in the sections, the respective stakeholder who is to approve the section.

14. The method of claim 2, wherein the reconstructed electronic document comprises a revision made to a respective section in the sections by one of the stakeholders.

15. The method of claim 2, wherein the stakeholders have signatory authority for the re-constructed electronic document, the acts further comprising:
    transmitting each approved section in the approved sections to the respective stakeholder computing device operated by the respective stakeholder who approved the section that corresponds to the approved section;
    subsequent to transmitting each approved section to the respective stakeholder computing device, receiving the approved sections with respective stakeholder signatures thereon; and
    storing the reconstructed electronic document in a datastore with the stakeholder signatures thereon.

16. The method of claim 2, the acts further comprising:
    subsequent to receiving the reconstructed electronic document with the signature thereon, transmitting the reconstructed electronic document and a second request for a second signature on the reconstructed electronic document to a second client computing device operated by a second authoritative user.

17. The computer-readable storage medium of claim 3, the acts further comprising:
    receiving a mapping from the client computing device, wherein the mapping defines, for each section in the sections, the respective stakeholder who is to approve the section.

18. The computer-readable storage medium of claim 3, wherein the reconstructed electronic document comprises a revision made to a respective section in the sections by one of the stakeholders who approved the respective section.

19. The computer-readable storage medium of claim 3, wherein the stakeholders have signatory authority for the re-constructed electronic document, the acts further comprising:
    transmitting each approved section in the approved sections to the respective stakeholder computing device operated by the respective stakeholder who approved the section that corresponds to the approved section;
    subsequent to transmitting each approved section to the respective stakeholder computing device, receiving the approved sections with respective stakeholder signatures thereon; and
    storing the reconstructed electronic document with the stakeholder signatures thereon in a datastore.

20. The computer-readable storage medium of claim 3, the acts further comprising:
    subsequent to receiving the reconstructed electronic document with the signature thereon, transmitting the reconstructed electronic document and a second request for a second signature on the reconstructed electronic document to a second client computing device operated by a second authoritative user.

* * * * *